US008023776B2

(12) United States Patent
Tsunoda (10) Patent No.: US 8,023,776 B2
(45) Date of Patent: Sep. 20, 2011

(54) MACH-ZEHNDER TYPE OPTICAL MODULATOR

(75) Inventor: Yukito Tsunoda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/536,880

(22) Filed: Aug. 6, 2009

(65) Prior Publication Data
US 2010/0040321 A1 Feb. 18, 2010

(30) Foreign Application Priority Data

Aug. 13, 2008 (JP) ................................. 2008-208491

(51) Int. Cl.
*G02F 1/035* (2006.01)
*G02F 1/225* (2006.01)
(52) U.S. Cl. .................................. 385/3; 385/2; 385/39
(58) Field of Classification Search ........................ None
See application file for complete search history.

(56) References Cited

U.S. PATENT DOCUMENTS

| | | | | |
|---|---|---|---|---|
| 5,249,243 A * | 9/1993 | Skeie | .................................. | 385/3 |
| 5,278,923 A * | 1/1994 | Nazarathy et al. | ................. | 385/3 |
| 6,091,864 A * | 7/2000 | Hofmeister | ........................ | 385/2 |
| 6,760,493 B2 * | 7/2004 | Pruneri et al. | ..................... | 385/8 |
| 2003/0021509 A1 * | 1/2003 | Yap et al. | ............................ | 385/3 |
| 2003/0147591 A1 * | 8/2003 | Doi et al. | ......................... | 385/39 |
| 2003/0219188 A1 * | 11/2003 | Doi et al. | ........................... | 385/3 |
| 2004/0101227 A1 * | 5/2004 | Takabayashi et al. | ........... | 385/11 |
| 2006/0133713 A1 * | 6/2006 | Yamada et al. | .................... | 385/5 |

OTHER PUBLICATIONS

Gnauck, A., "40-Gb/s RZ-Differential Phase Shift Keyed Transmission", ThE1, vol. 2, OFC 2003, pp. 450-451.
Doerr, C.R., et al., "Monolithic Demodulator for 40-gb/s DQPSK Using a Star Coupler", Journal of Lightwave Technology, vol. 24, No. 1, Jan. 2006, pp. 171-174.

* cited by examiner

*Primary Examiner* — Mike Stahl
(74) *Attorney, Agent, or Firm* — Staas & Halsey LLP

(57) ABSTRACT

A Mach-Zehnder type optical modulator includes an optical waveguide formed in an electro-optical substrate, an input section that inputs light to the optical waveguide, a plurality of branch modulation sections that generate branched input light, extend from the input section and modulate the branched input light, an interference photocoupler including a plurality of input ports and a plurality of output ports, the input ports being coupled to the branch modulation sections, and an output photocoupler including a plurality of input ports coupled to the output ports of the interference photocoupler and also including a plurality of output ports.

11 Claims, 11 Drawing Sheets

FIG. 3A

FIG. 3B
INTERFERENCE LIGHT ④

FIG. 3C
INTERFERENCE LIGHT ⑤

FIG. 3D

OUTPUT LIGHT ⑥ $\;1/\sqrt{2}\, E_0 \exp j(\omega t + \phi)$
$\phi = 0 \Leftrightarrow \pi$

FIG. 4

INPUT LIGHT ①: $E_0 \exp j(\omega t)$

MODULATED LIGHT ②: $\frac{1}{\sqrt{2}} E_0 \exp j(\omega t + \phi)$    $\phi$: PHASE MODULATION ADDED
$(\phi: 0 \Leftrightarrow \pi)$ MODULATED LIGHT ③: $\frac{1}{\sqrt{2}} E_0 \exp j(\omega t)$ INTERFERENCE LIGHT ④: $\frac{1}{2} E_0 \exp j(\omega t + \pi/4 + \phi) + \frac{1}{2} E_0 \exp j(\omega t - \pi/4)$
$= \frac{1}{2} E_0 \exp j(\omega t + \phi/2) \cdot \{\exp j(\phi/2 + \pi/4) + \exp j(-\phi/2 - \pi/4)\}$ INTERFERENCE LIGHT ⑤: $\frac{1}{2} E_0 \exp j(\omega t - \pi/4 + \phi) + \frac{1}{2} E_0 \exp j(\omega t + \pi/4)$
$= \frac{1}{2} E_0 \exp j(\omega t + \phi/2) \cdot \{\exp j(\phi/2 - \pi/4) + \exp j(-\phi/2 + \pi/4)\}$ OUTPUT LIGHT ⑥: $\frac{1}{2\sqrt{2}} E_0 \exp j(\omega t + \phi/2 - \pi/4) \cdot \{\exp j(\phi/2 + \pi/4) + \exp j(-\phi/2 - \pi/4)\}$
$+ \frac{1}{2\sqrt{2}} E_0 \exp j(\omega t + \phi/2 - \pi/4) \cdot \{\exp j(\phi/2 - \pi/4) + \exp j(-\phi/2 + \pi/4)\}$
$= \frac{1}{\sqrt{2}} E_0 \exp j(\omega t + \phi)$ ...... $0 \Leftrightarrow \pi$ PHASE MODULATION

FIG. 6A
MODULATED LIGHT ②

FIG. 6B
MODULATED LIGHT ③

FIG. 6C
INTERFERENCE LIGHT ④

FIG. 6D
INTERFERENCE LIGHT ⑤

FIG. 6E

OUTPUT LIGHT ⑥ $\cos(\phi + \pi/4) \cdot E_0 \exp j(\omega t)$
$\phi = 0 \Leftrightarrow \pi/2$

FIG. 7

INPUT LIGHT ①: $E_0 \exp j(\omega t)$

MODULATED LIGHT ②: $\frac{1}{\sqrt{2}} E_0 \exp j(\omega t + \pi/4 + \phi)$   $\phi$: PHASE MODULATION ADDED
$(\phi: 0 \Leftrightarrow \pi/2)$ MODULATED LIGHT ③: $\frac{1}{\sqrt{2}} E_0 \exp j(\omega t - \pi/4 - \phi)$ INTERFERENCE LIGHT ④: $\frac{1}{2} E_0 \exp j(\omega t + \pi/2 + \phi) + \frac{1}{2} E_0 \exp j(\omega t - \pi/2 - \phi)$
$= \frac{1}{2} E_0 \exp j(\omega t) \cdot \{\exp j(\phi + \pi/2) + \exp j(-\phi - \pi/2)\}$ INTERFERENCE LIGHT ⑤: $\frac{1}{2} E_0 \exp j(\omega t + \phi) + \frac{1}{2} E_0 \exp j(\omega t - \phi)$
$= \frac{1}{2} E_0 \exp j(\omega t) \cdot \{\exp j(\phi) + \exp j(-\phi)\}$ OUTPUT LIGHT ⑥: $\frac{1}{2\sqrt{2}} E_0 \exp j(\omega t) \cdot \{\exp j(\phi + \pi/2) + \exp j(-\phi - \pi/2)\}$
$+ \frac{1}{2\sqrt{2}} E_0 \exp j(\omega t) \cdot \{\exp j(\phi) + \exp j(-\phi)\}$
$= \cos(\phi + \pi/4) \cdot E_0 \exp j(\omega t)$

THEREFORE

WHEN $\phi = 0$: $\frac{1}{\sqrt{2}} E_0 \exp j(\omega t + 0)$
  PHASE 0

WHEN $\phi = \pi/2$: $-\frac{1}{\sqrt{2}} E_0 \exp j(\omega t) = \frac{1}{\sqrt{2}} E_0 \exp j(\omega t + \pi)$
  PHASE $\pi$

RELATED ART

MACH-ZEHNDER TYPE OPTICAL MODULATOR

CROSS-REFERENCE TO RELATED APPLICATION(S)

This application is based upon and claims the benefit of priority of the prior Japanese Patent Application No. 2008-208491, filed on Aug. 13, 2008, the entire contents of which are incorporated herein by reference.

FIELD

Various embodiments discussed herein relate to a Mach-Zehnder type optical modulator and to a technique for reducing a drive voltage of a Mach-Zehnder type optical modulator.

BACKGROUND

With the advance of constructions of large-volume optical transmission networks, there are problems to be addressed such as how to further expand transmission capacities and extend transmission distances. Instead of an optical intensity modulation scheme for transmitting data using ON/OFF of light, an optical transmission network using an optical phase modulation scheme such as DPSK (Differential Phase Shift Keying) is under study as one means for solving the problems. For example, FIG. 10 illustrates an optical transmitter based on a DPSK modulation scheme used for an optical transmission network using such a phase modulation scheme.

Figure 10:
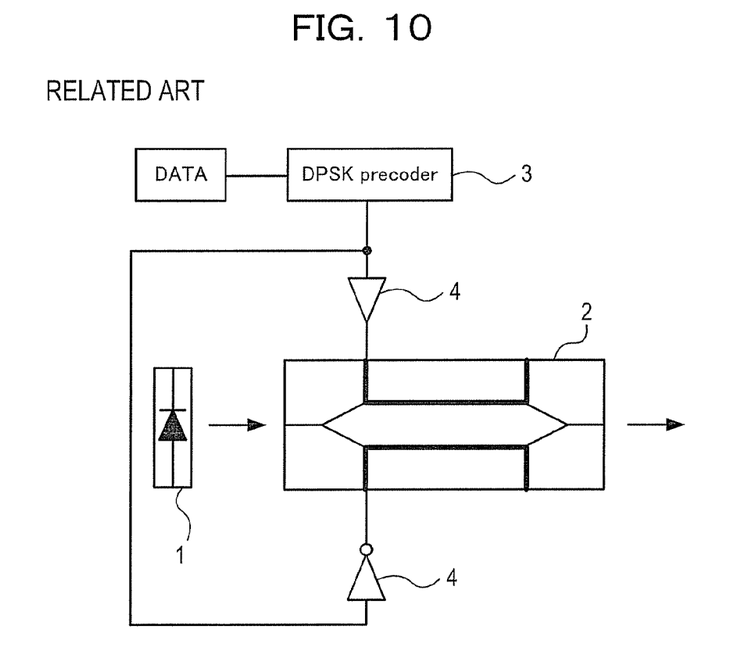
FIG. 10 illustrates a block diagram of an optical transmitter according to a prior art.
Figure 11A:
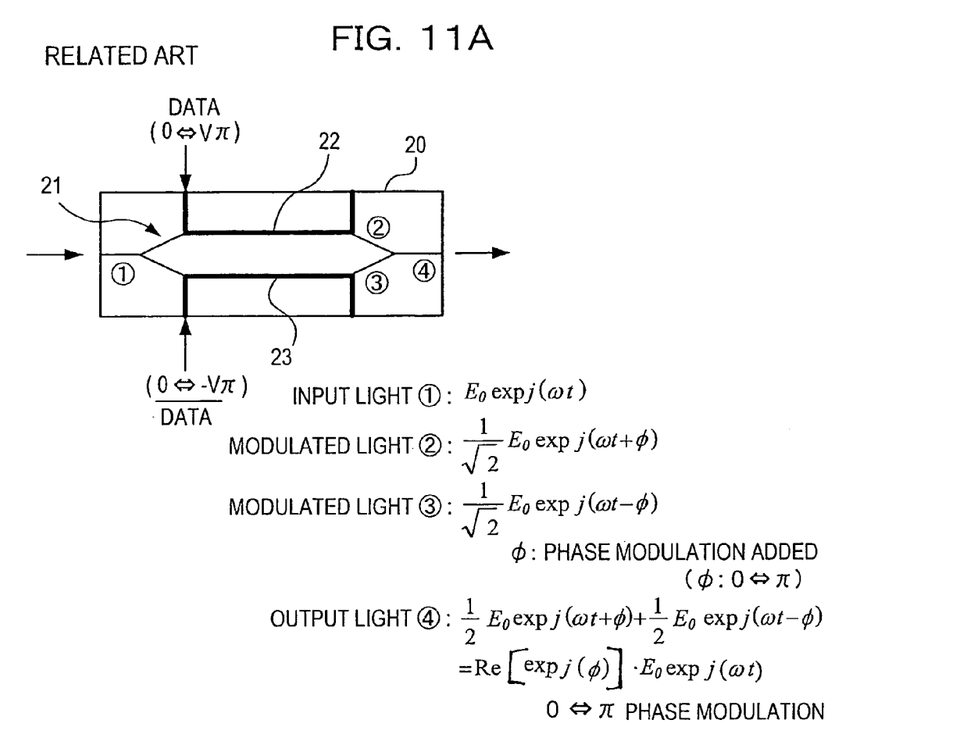
FIG. 11A and FIG. 11B illustrate a plan view and phase variations of a Mach-Zehnder type optical modulator according to the prior art.
Figure 11B:
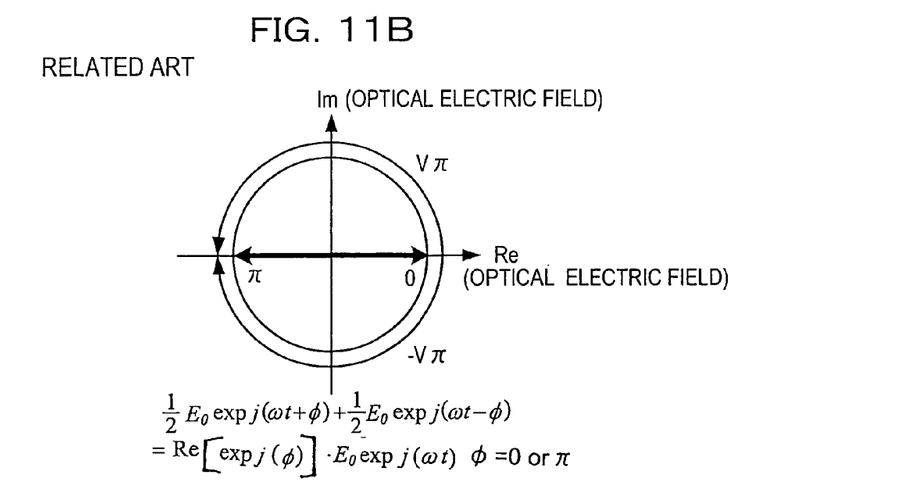

The optical transmitter illustrated in FIG. 10 has a configuration in which CW (Continuous Wave) light output from a semiconductor laser 1 is phase-modulated through a Mach-Zehnder type optical phase modulator 2 and transmitted as an optical signal. The optical phase modulator 2 outputs a phase-modulated optical signal using a drive signal output from a driver 4 according to a data signal that has passed through a DPSK precoder 3, and the mechanism thereof is shown in FIG. 11. A Mach-Zehnder type optical waveguide 21 is formed in an electro-optical crystal substrate 20 represented by LiNbO$_3$ (hereinafter referred to as "LN") and traveling wave electrodes 22 and 23 are formed on the surface of the substrate 20. The optical waveguide 21 is a Mach-Zehnder type optical waveguide including an input section that faces a substrate end face for inputting light, branch modulation sections (arms) that branch and extend from the input section and an output section that combines the branch modulation sections and faces a substrate end face. When electric fields from the traveling wave electrodes 22 and 23 act on the parts of the branch modulation sections of the optical waveguide 21, the refractive index of the optical waveguide changes and phase modulation takes place.

As for the voltages of the drive signals applied to the electrodes 22 and 23, when a voltage that causes the phase difference between light beams propagating through the two branch modulation sections of the optical waveguide 21 to be a half wavelength is V$\pi$, giving a voltage V$\pi$ to one electrode 22 and a voltage −V$\pi$ to the other electrode 23 (inverted) allows the output light to have a phase variation of $\pi$. Therefore, the drive signal output from the driver 4 causes the one electrode 22 to vary from 0 to V$\pi$ and causes the other electrode 23 to vary from 0 to −V$\pi$, and can thereby perform optical phase modulation of phase 0, $\pi$ (e.g., non-Patent Document "40-Gb/s RZ-Differential Phase Shift Keyed Transmission", A. Gnauck, ThE1, pp. 450-451, Vol. 2, OFC 2003).

Figure 12A:
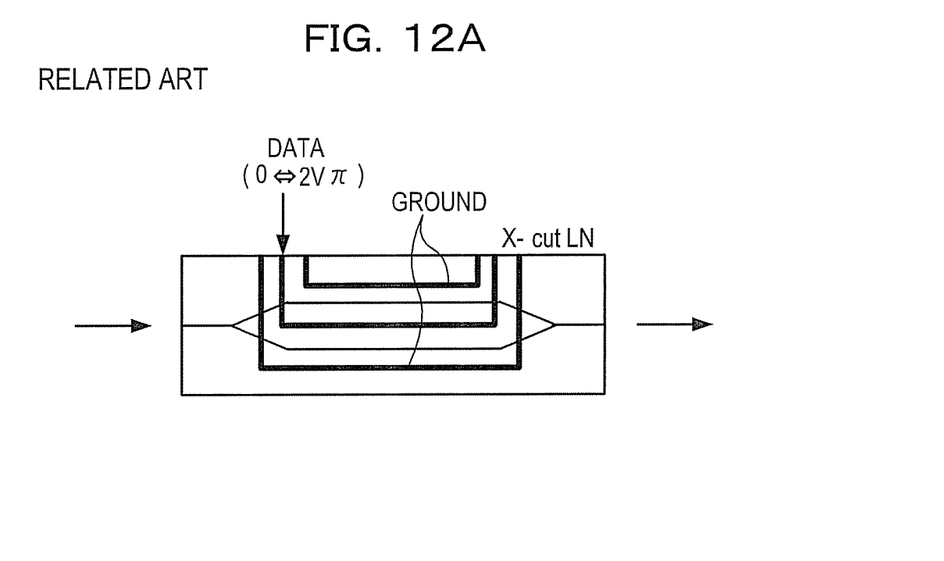
FIG. 12A and FIG. 12B illustrate a plan view of another Mach-Zehnder type optical modulator according to the prior art.
Figure 12B:
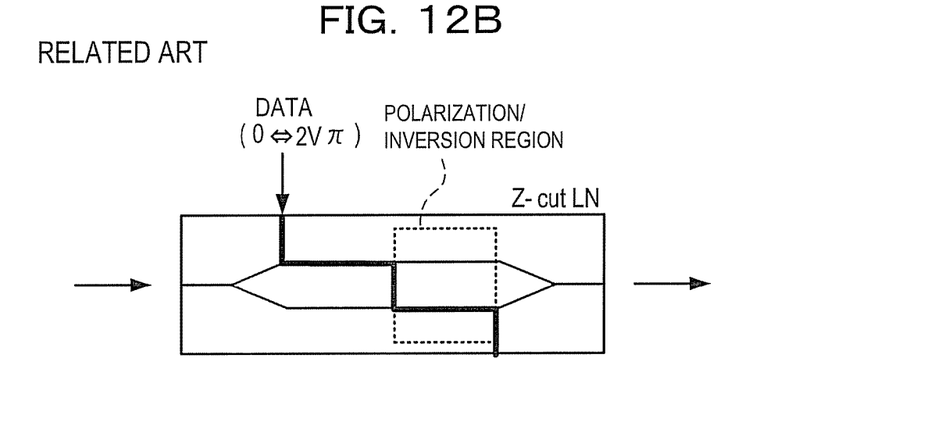

For the optical phase modulator 20 based on the above described scheme, electric signals of opposite phases need to be simultaneously applied to the electrodes 22 and 23 of both branch modulation sections, and therefore there is a problem that it is difficult to adjust timing of drive signals in high-speed transmission of 40 Gb/s or the like. Thus, instead of such a dual drive scheme, there is also a proposal of a single drive scheme having one traveling wave electrode to which a drive signal is applied, such as an optical phase modulator using an X-cut LN substrate as shown in FIG. 12A or an optical phase modulator with a polarization inversion region formed in a Z-cut LN substrate as shown in FIG. 12B.

However, when this single drive scheme is adopted, if the voltage that causes the optical phase difference between the branch modulation sections to be a half optical wavelength is assumed to be V$\pi$ as described above, the drive signal needs to be made to vary from 0 to 2V$\pi$ to realize optical phase modulation of phase 0, $\pi$. That is, under the single drive scheme, the voltage of the drive signal increases, which is a problem to be solved when applied to high-speed transmission.

SUMMARY

A Mach-Zehnder type optical modulator includes an optical waveguide formed in an electro-optical substrate, an input section that inputs light to the optical waveguide, a plurality of branch modulation sections that generate branched input light, extend from the input section and modulate the branched input light, an interference photocoupler including a plurality of input ports and a plurality of output ports, the input ports being coupled to the branch modulation sections, and an output photocoupler including a plurality of input ports coupled to the output ports of the interference photocoupler and also including a plurality of output ports.

A Mach-Zehnder type optical modulator including an optical waveguide formed in an electro-optical substrate, an input photocoupler including a plurality of input ports that are configured to input light to the optical waveguide and a plurality of output ports, a plurality of branch modulation sections that generate branched input light, extend from the output ports of the input photocoupler section and modulate the branched input light, an interference photocoupler section including a plurality of input ports and a plurality of output ports, the input ports being coupled to the branch modulation section, and an output photocoupler section including a plurality of input ports coupled to the output ports of the interference photocoupler section and also including one output port.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DETAILED DESCRIPTION OF THE PREFERRED EMBODIMENTS

Figure 1A:
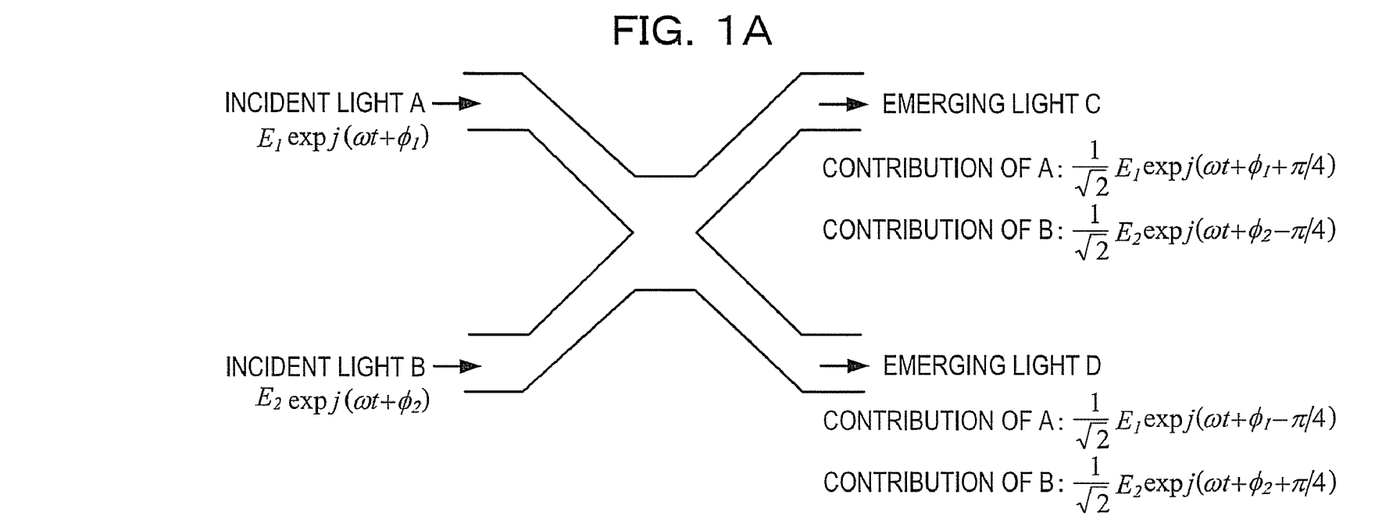
FIG. 1A and FIG. 1B illustrate an optical phase relationship between input ports and output ports of a 2×2 photocoupler.
Figure 1B:
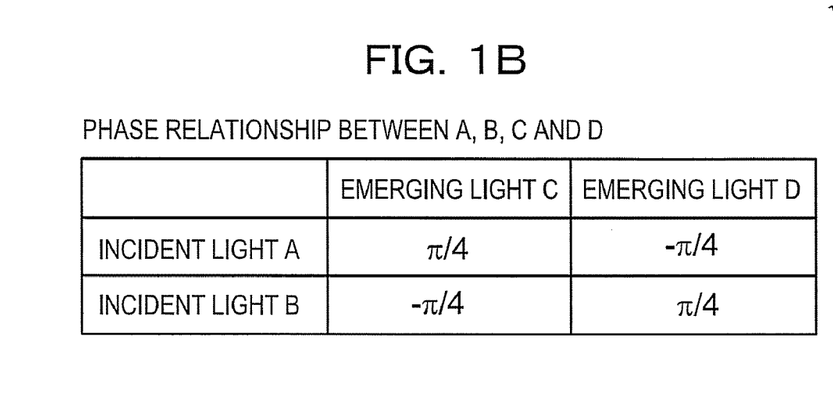

First of all, a phase relationship of light that impinges upon/emerges from a photocoupler having a plurality of inputs×a plurality of outputs will be explained. FIG. 1A and FIG. 1B illustrate a phase relationship between incident light and emerging light of a photocoupler having two inputs×two outputs as an example of a photocoupler section provided for the optical waveguide proposed above. On the other hand, FIG. 2A and FIG. 2B illustrate a phase relationship between incident light and emerging light of a photocoupler having two inputs×one output.

Figure 2A:
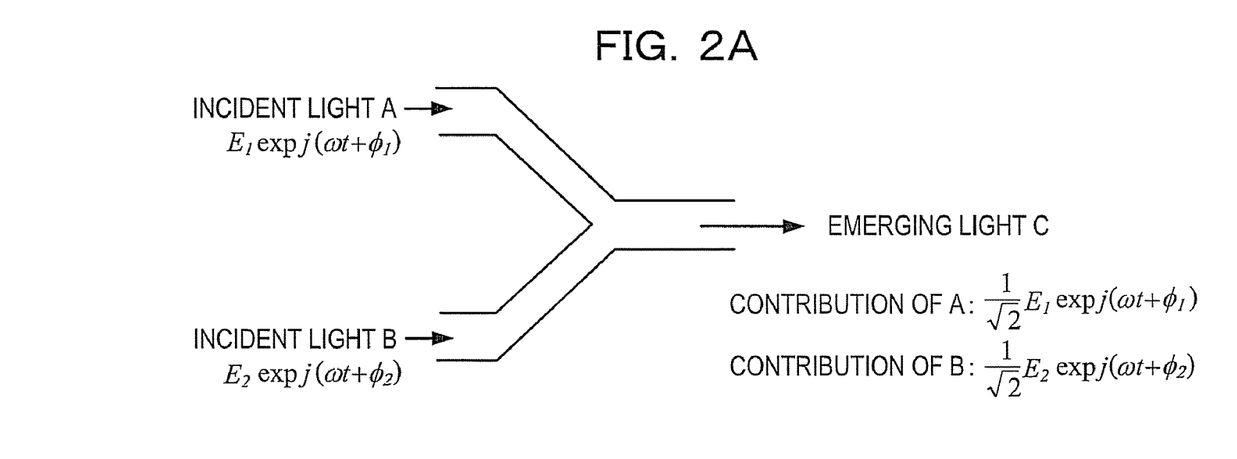
FIG. 2A and FIG. 2B illustrate an optical phase relationship between input ports and an output port of a 2×1 photocoupler.
Figure 2B:
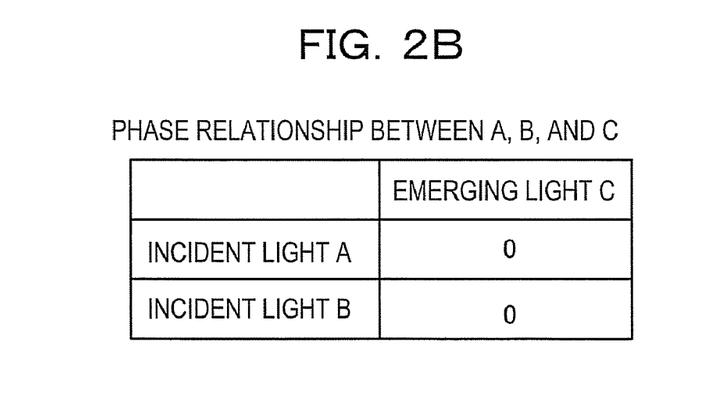

For the 2×1 photocoupler shown in FIG. 2A, incident light beams A and B that impinge upon two input ports are coupled and output from an output port, and therefore no phase shift occurs in an emerging light beam C (FIG. 2B) with respect to the incident light beams A and B. On the other hand, for the 2×2 photocoupler shown in FIG. 1A, incident light beams A and B that impinge upon two input ports interfere with each other and are then output from two output ports, and therefore phase shifts of ±π/4 occur in emerging light beams C and D with respect to the incident light beams A and B. This is because the incident light and emerging light in the 2×2 photocoupler as shown in FIG. 1A have a relationship shown in the following expression (1) (see: "Monolithic Demodulator for 40-Gb/s DQSP Using a Star Coupler", Christopher R. Doerr et al., Journal of Lightwave Technology, Vol. 24, No. 1, January 2006). In the expression, "φM" is the amount of phase variation of the emerging light with respect to the incident light, "mleft" is an input port number, "mright" is an output port number and "M" is the number of input/output ports.

$$\phi M(mleft, mright) = (2\pi/M)\{mleft - (M+1)/2\}\{mright - (M+1)/2\} \quad (1)$$

FIGS. 3A-3D illustrate a Mach-Zehnder type optical modulator of the present embodiment using this phase relationship. The optical modulator uses a Z-cut LN substrate 100 as an electro-optical crystal substrate and a Mach-Zehnder type optical waveguide 101 is formed in the substrate 100. To input CW light from a semiconductor laser or the like, the optical waveguide 101 is provided with an input section 102 that faces one end face of the substrate 100 and two branch modulation sections 103 and 104 that branch and extend in parallel from the input section 102. An interference photocoupler section 105 having two inputs×two outputs is provided and has input ports that are coupled to the branch modulation sections 103 and 104 respectively. Furthermore, an output photocoupler section 106 having two inputs×two outputs is provided and has input ports that are coupled to the two output ports of the interference photocoupler section 105 and whose output ports face the other end face of the substrate 100. An output optical signal can be obtained from one of the output ports of the output photocoupler section 106.

Figure 3A:
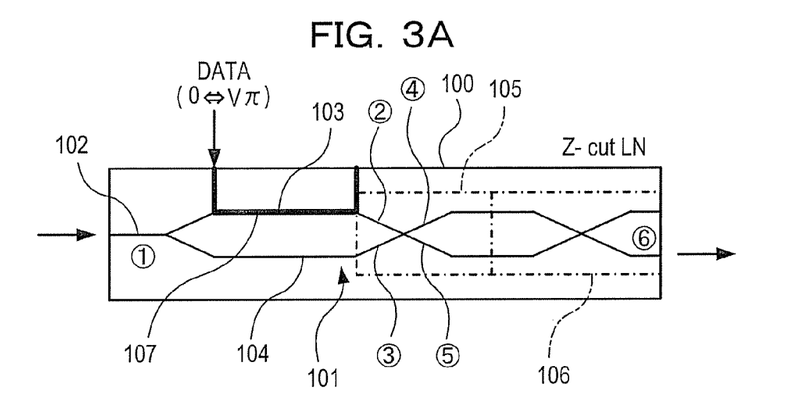
FIG. 3A, FIG. 3B, FIG. 3C, and FIG. 3D illustrate a plan view and phase variations showing a Mach-Zehnder type optical modulator according to a first embodiment.
Figure 3B:
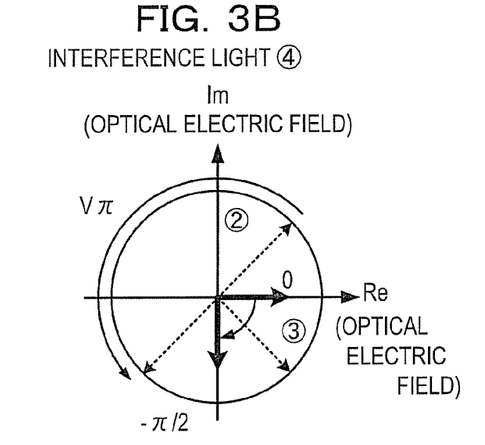
Figure 3C:
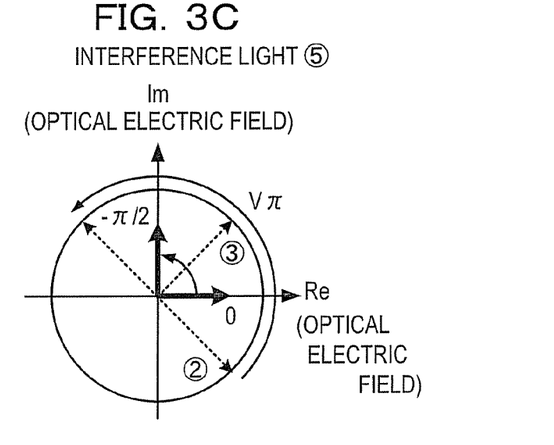
Figure 3D:
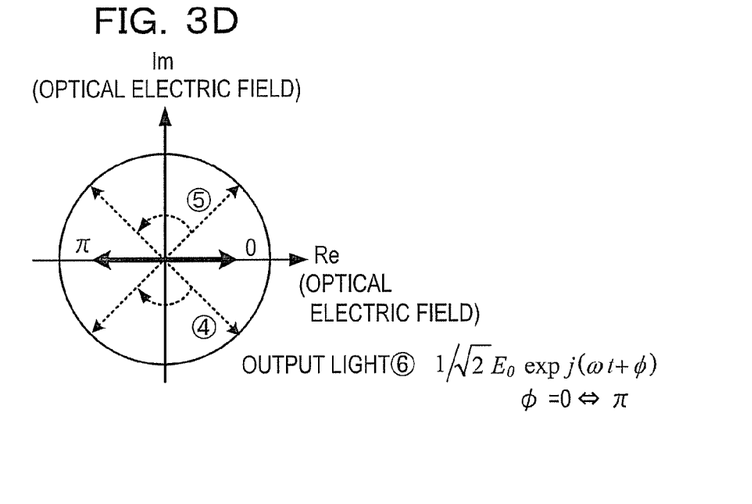

In the optical waveguide 101, the modulated light beams that have passed through the branch modulation sections 103 and 104 are input to the input ports of the interference photocoupler section 105, which constitutes a 2×2 photocoupler as shown in FIGS. 1A and 1B. Therefore, phase shifts of ±π/4 are produced in interference light beams (which correspond to C and D in FIGS. 1A and 1B) output from the output ports of the interference photocoupler section 105 with respect to the modulated light beams (which correspond to A and B in FIGS. 1A and 1B) of the branch modulation sections 103 and 104. Furthermore, the interference light beams output from the interference photocoupler section 105 are input to the input ports of the output photocoupler section 106, respectively. Since the output photocoupler section 106 also constitutes a 2×2 photocoupler as shown in FIG. 1A, phase shifts of ±π/4 are produced in output light beams (which correspond to C and D in FIGS. 1A and 1B) output from the output ports with respect to the interference light beams (which correspond to A and B in FIGS. 1A and 1B) input to the input ports.

One traveling wave electrode 107 is formed on the surface of the substrate 100 in order to change the refractive index of the optical waveguide of the one branch modulation section 103 with respect to the branch modulation sections 103 and 104 in the optical waveguide 101 formed in the substrate 100. The traveling wave electrode 107 illustrated here is formed so as to superimpose on the branch modulation section 103, receives a drive signal from the driver as shown, for example, in FIG. 10 and applies an electric field to the branch modulation section 103. The drive signal applied to the traveling wave electrode 107 can apply optical phase modulation of phase 0, π according to a data signal with a voltage variation from 0 to Vπ when a voltage that causes the optical phase difference between the branch modulation sections 103 and 104 to be a half wavelength is Vπ.

Figure 4:
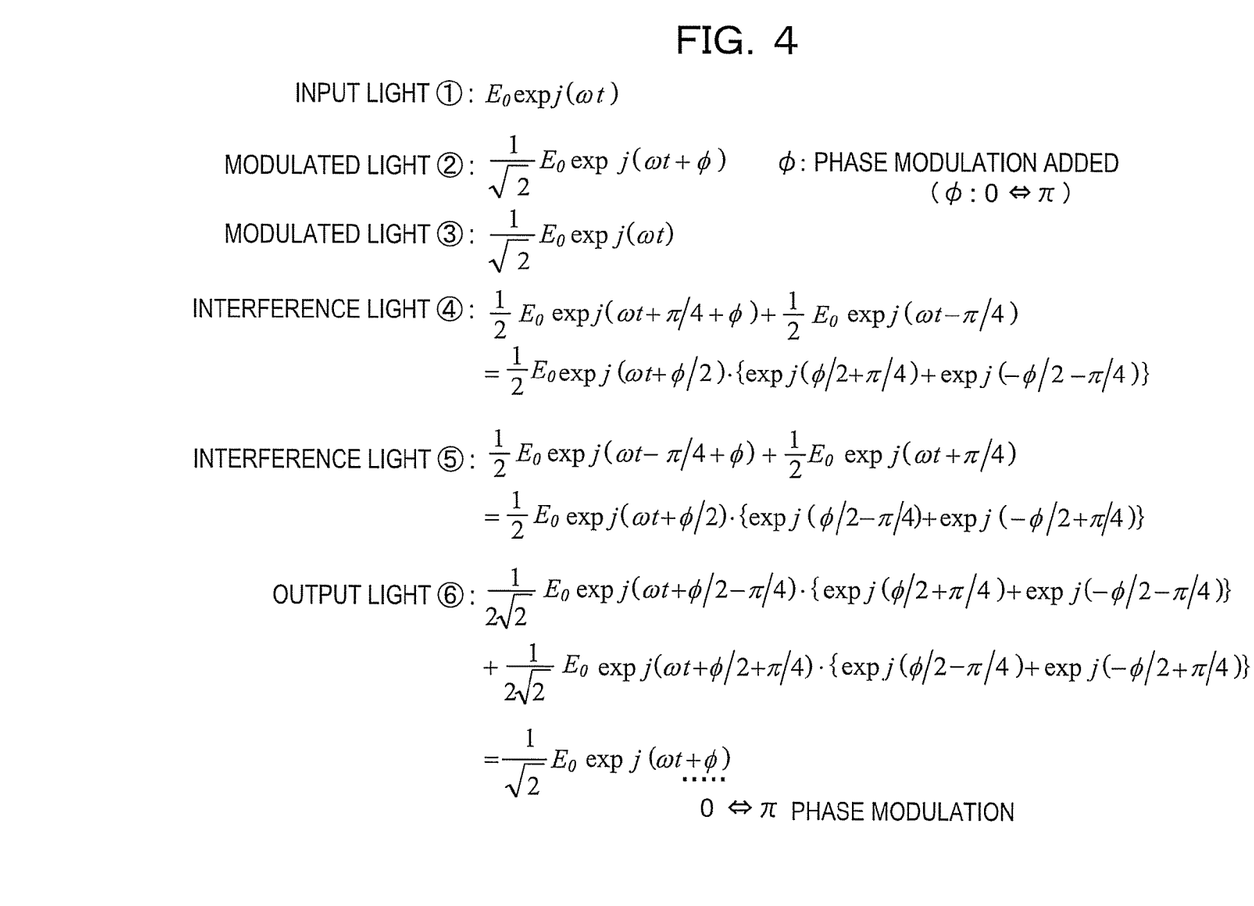
FIG. 4 illustrates phase variations of light of the Mach-Zehnder type optical modulator according to the first embodiment as mathematical expressions.

That is, as is also shown in the mathematical expressions in FIG. 4, when phase modulation of φ(0 to π) is applied only to the modulated light of the one branch modulation section 103, a phase shift occurs when the light passes through the interference photocoupler section 105 and the output photocoupler section 106, and phase modulation of φ(0 to π) appears in the output light. That is, according to the optical waveguide 101 of the present embodiment, changing the voltage of the drive signal applied to the one traveling wave electrode 107 from 0 to Vπ allows phase modulation of phase 0, π to be added to the output light output from the output photocoupler section 106. As shown in the expressions in FIG. 11, according to the optical waveguide of the prior art, no phase modulation of φ appears in the output light unless phase modulation of +φ is given to the modulated light of one branch modulation section and phase modulation of −φ is given to the modulated light of the other branch modulation section. Therefore, the voltage of the drive signal requires 0 to 2Vπ in a single drive scheme and 0 to Vπ and 0 to −Vπ in a dual drive scheme. Compared to this, according to the optical waveguide 101 of the present embodiment, it is apparent that the voltage required for the drive signal is only 0 to Vπ under a single drive scheme, that is, half the level of the prior art.

The output port of the output photocoupler section 106 from which output light is extracted in the illustrated optical waveguide 101 is selected depending on which output light with a positive phase or opposite phase is obtained. Furthermore, an example of the optical waveguide in which two branch modulation sections are branched from the input section is shown but the photocoupler section is also applicable to a case where the input section is branched into three or more branch modulation sections. Alternatively, the photocoupler section is also applicable to a multi-value modulation scheme such that the respective branch modulation sections branched from the input section are further branched.

Figure 5A:
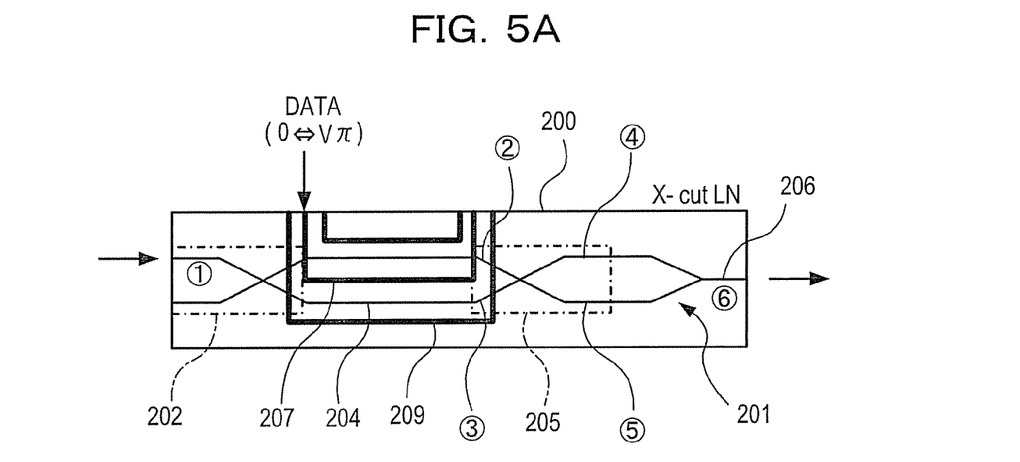
FIG. 5A illustrates a plan view of a Mach-Zehnder type optical modulator according to a second embodiment and FIG. 5B illustrates a plan view of a Mach-Zehnder type optical modulator according to a third embodiment.
Figure 5B:
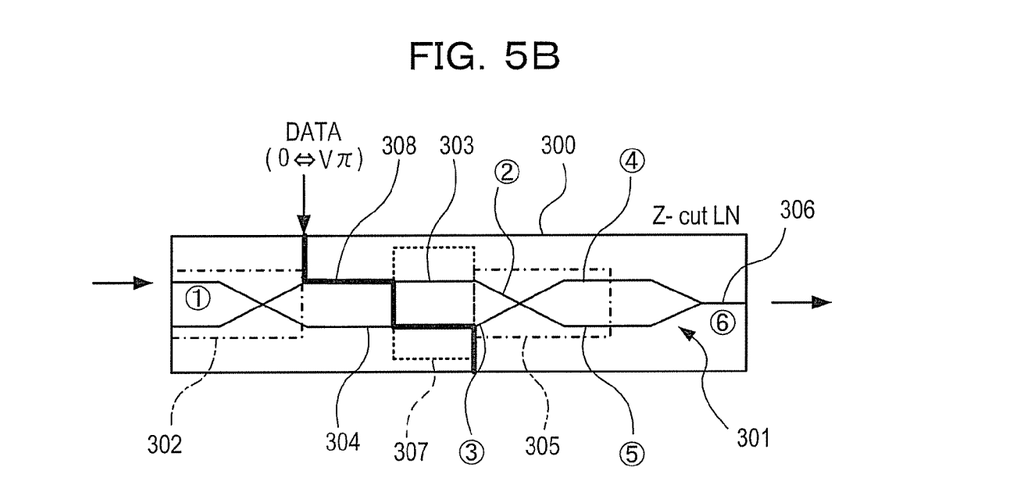
Figure 6A:
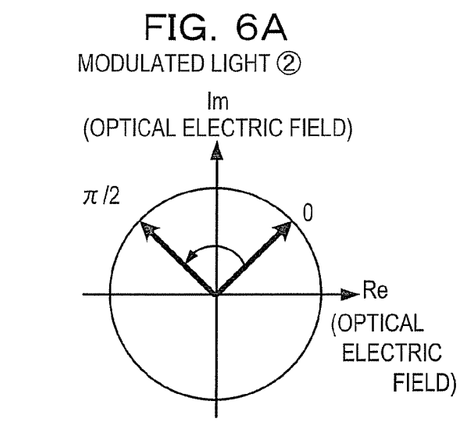
FIG. 6A, FIG. 6B, FIG. 6C, FIG. 6D, and FIG. 6E illustrate phase variations of light in the Mach-Zehnder type optical modulator according to the second and third embodiments.
Figure 6B:
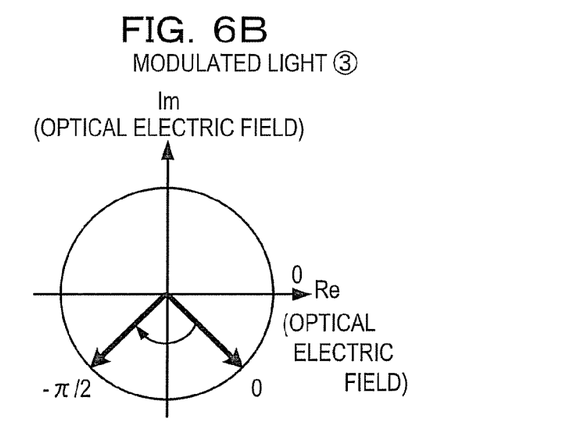
Figure 6C:
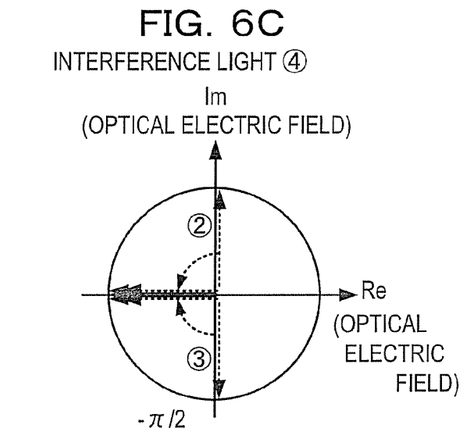
Figure 6D:
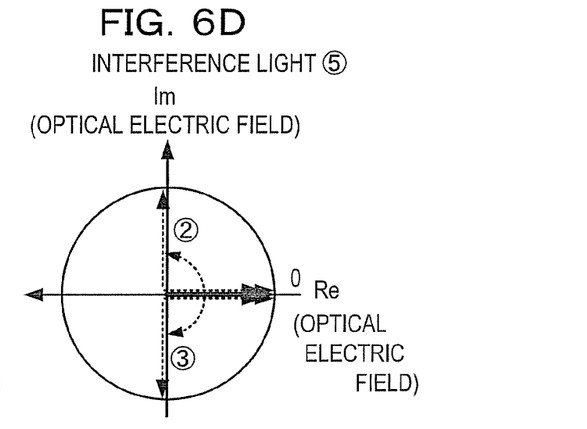
Figure 6E:
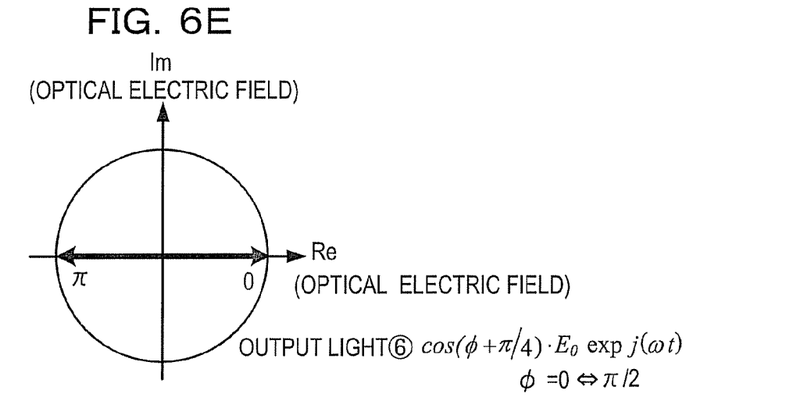

FIG. 5A and FIG. 5B illustrate other embodiments of a Mach-Zehnder type optical modulator provided with a traveling wave electrode under a single drive scheme. FIG. 5A is an embodiment using an X-cut LN substrate and FIG. 5B is an embodiment using a Z-cut LN substrate.

In the embodiment of FIG. 5A, an optical waveguide 201 formed in an LN substrate 200 is provided with an input photocoupler section 202 having two inputs×two outputs as an input section and the input ports thereof face one end face of the substrate 200. Branch modulation sections 203 and 204 extend from the output ports of the input photocoupler section 202. Two input ports of an interference photocoupler section 205 having two inputs×two outputs are coupled to the branch modulation sections 203 and 204. The two output ports of the interference photocoupler section 205 are coupled to input ports of an output photocoupler section 206 having two inputs×one output. One output port of the output photocoupler section 206 faces the other end face of the substrate 200.

In the optical waveguide 201, when light is input to one of the input ports of the input photocoupler section 202, phase modulated output light is obtained from the output port of the output photocoupler section 206. A traveling wave electrode 207 is formed on the substrate surface so as to extend at an intermediate position between the branch modulation sections 203 and 204 and two grounding electrodes 208 and 209, spaced apart from each other by a predetermined distance, extend along both sides of the traveling wave electrode 207. The refractive indices of the optical waveguides of the branch modulation sections 203 and 204 vary according to electric fields produced between the traveling wave electrode 207 and the grounding electrodes 208 and 209.

In the embodiment of FIG. 5B, an optical waveguide 301 formed in an LN substrate 300 has the same structure as that of the optical waveguide 201 in FIG. 5A, and is provided with an input photocoupler section 302 having two inputs×two outputs as an input section, input ports of which face one end face of the substrate 300. Branch modulation sections 303 and 304 extend from the output ports of the input photocoupler section 302 and two input ports of an interference photocoupler section 305 having two inputs×two outputs are coupled to the branch modulation sections 303 and 304. Two output ports of the interference photocoupler section 305 are coupled to input ports of an output photocoupler section 306 having two inputs×one output and the one output port of the output photocoupler section 306 faces the other end face of the substrate 300.

For the optical waveguide 301, when light is input to any one input port of the input photocoupler section 302, phase modulated output light is also obtained from the output port of the output photocoupler section 306. A polarization inversion region 307 is formed in part of the area where the branch modulation sections 303 and 304 are formed in the substrate 300 having such an optical waveguide 301. One traveling wave electrode 308 extends on the substrate 300 so as to superimpose on the one branch modulation section 303 outside the polarization inversion region 307 and superimpose on the other branch modulation section 304 inside the polarization inversion region 307. That is, the traveling wave electrode 308 extends in a stepped shape so as to change the refractive index of the optical waveguide of the different branch modulation sections 303 and 304 inside and outside the polarization inversion region 307.

Figure 7:
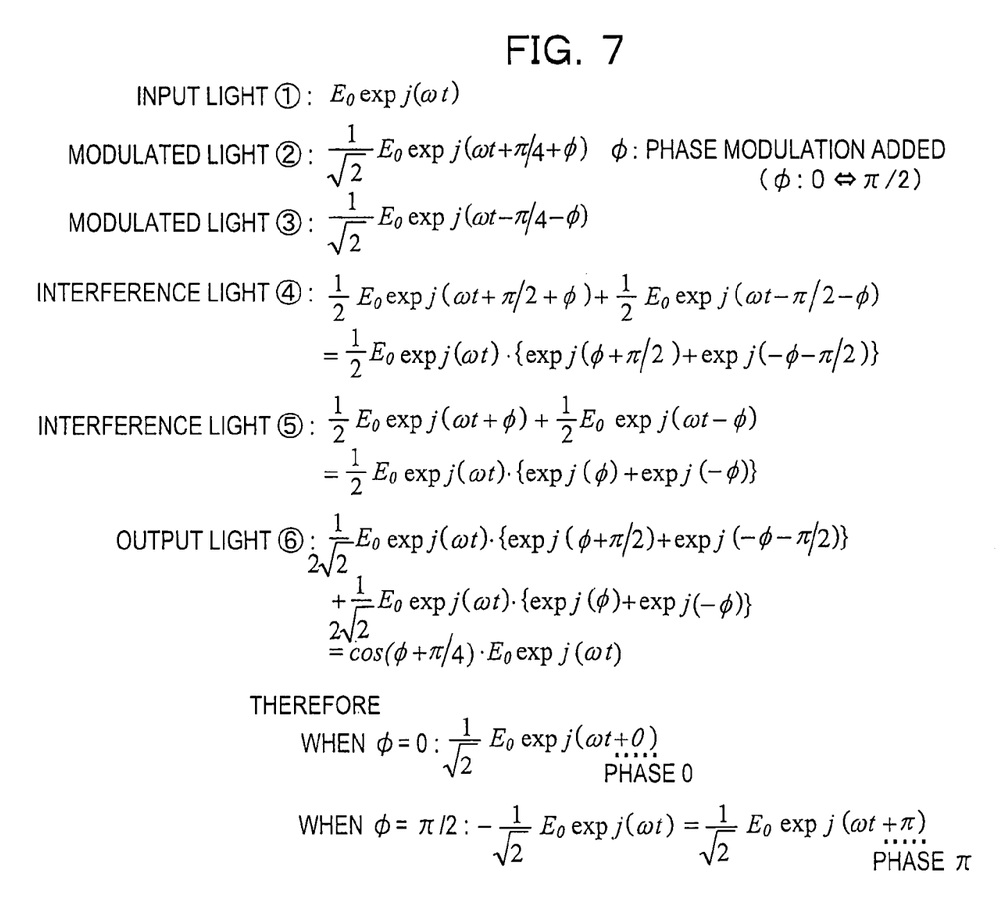
FIG. 7 illustrates phase variations of light in the Mach-Zehnder type optical modulator according to the second and third embodiments as mathematical expressions.

FIGS. 6A-6E illustrate phase shifts in the embodiments shown in FIG. 5A and FIG. 5B and FIG. 7 illustrates the mathematical expressions thereof. Because of the nature of the input photocoupler section 202 or 302, the phase shifts of ±π/4 explained in FIG. 1 are produced between the light propagating through the one branch modulation section 203 or 303 and the light propagating through the other branch modulation section 204 or 304 at first. When modulated light for adding phase modulation φ (0 to π/2, 0 to −π/2) to the light through the branch modulation section 203 or 303, and branch modulation section 204 or 304 is input to the interference photocoupler section 205 or 305, the phase shifts of ±π/4 explained in FIG. 1A and FIG. 1B are produced in each interference light beam due to the nature of the photocoupler. As a result of these interference light beams being coupled by the output photocoupler section 206 or 306, phase modulation of phase 0, π appears in the output light. That is, when a voltage which causes the optical phase difference between the branch modulation sections 203 or 303, and 204 or 304 to be a half wavelength is Vπ, if the voltage of the drive signal applied to the traveling wave electrode 207 or 308 is made to change from 0 to Vπ, optical phase modulation of phase 0, π according to a data signal can be added.

Figure 8:
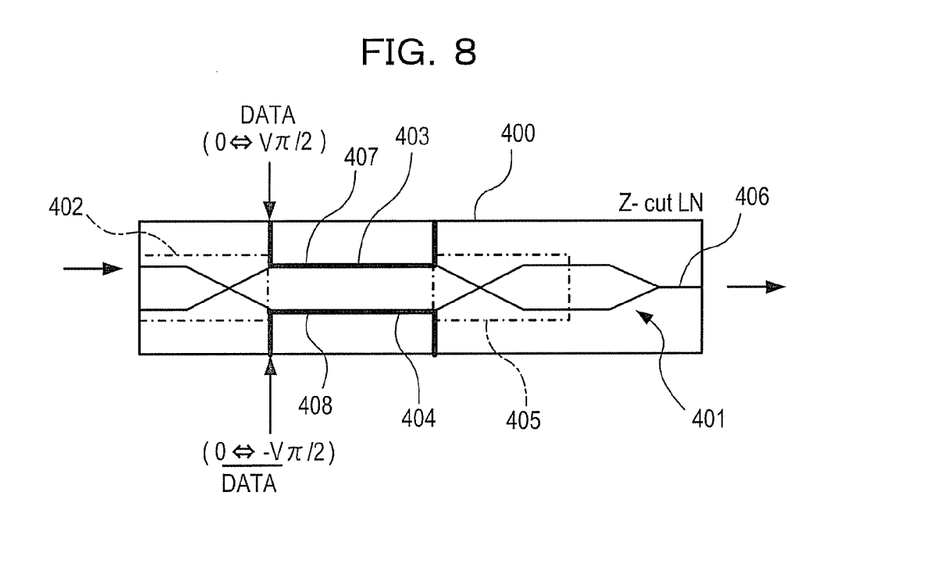
FIG. 8 illustrates a plan view of a Mach-Zehnder type optical modulator according to a fourth embodiment.

FIG. 8 illustrates an embodiment based on a dual drive scheme. In the embodiment illustrated in FIG. 8, an optical waveguide 401 similar to that of the embodiments in FIG. 5A and FIG. 5B is formed in a Z-cut LN substrate 400. That is, the optical waveguide 401 is provided with an input photocoupler section 402 having two inputs×two outputs, branch modulation sections 403 and 404 that extend from the output ports thereof, an interference photocoupler section 405 having two inputs×two outputs whose input ports are coupled to the branch modulation sections 403 and 404 and an output photocoupler section 406 having two inputs×one output whose input ports are coupled to the output ports of the interference photocoupler section 405. For each of the branch modulation sections 403 and 404, a total of two traveling wave electrodes 407 and 408 are disposed on the substrate so as to superimpose on the branch modulation sections 403 and 404 respectively to change the refractive indices of the optical waveguides of the branch modulation sections 403 and 404.

In this dual drive scheme, complementary signals need to be applied to both traveling wave electrodes 407 and 408 as described above. However, as is understandable with reference to the mathematical expressions in FIG. 4, when the voltage that causes the optical phase difference between the branch modulation sections 403 and 404 to be a half wavelength is Vπ, if the voltage of the drive signal is made to change from 0 to Vπ/2 and from 0 to −Vπ/2, optical phase modulation of phase 0, π can be given to the output light. That is, though the drive signals in a complementary relationship need to be applied to both traveling wave electrodes, the voltage required is only ½, and thus the present embodiment is more readily applicable to high frequencies.

Figure 9:
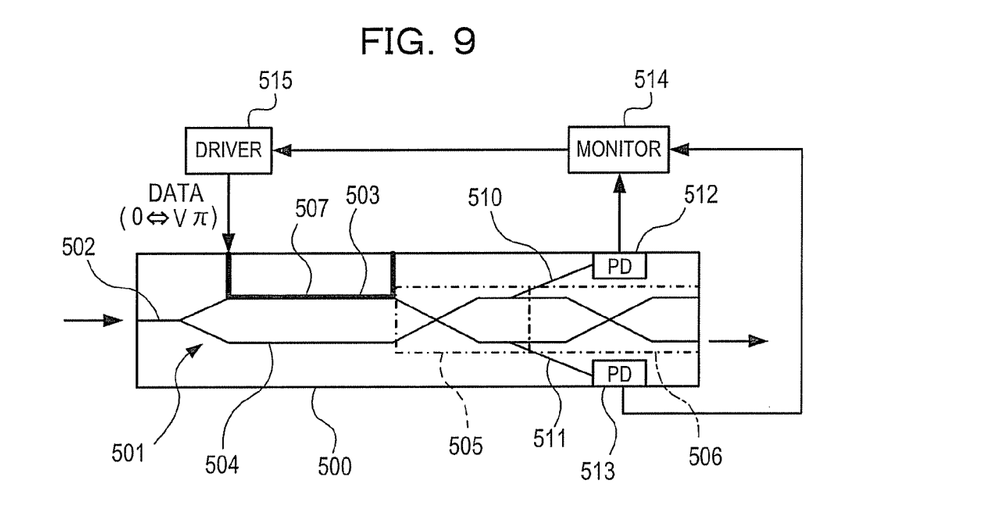
FIG. 9 illustrates a plan view of a Mach-Zehnder type optical modulator according to a fifth embodiment.

FIG. 9 illustrates an embodiment in which part of interference light that has passed through an interference photocoupler section is extracted and monitored, and feedback is given to the driver (see FIG. 10) based on the monitoring result to thereby allow drive signals to be controlled.

An optical waveguide 501 similar to that of the embodiment in FIG. 3A is formed in an LN substrate 500. That is, the optical waveguide 501 illustrated in FIG. 9 includes an input section 502 to input light that faces a substrate end face, branch modulation sections 503 and 504 that are branched into two portions and extend in parallel from the input section 502, an interference photocoupler section 505 having two inputs×two outputs whose input ports are coupled to the branch modulation sections 503 and 504, respectively, and an output photocoupler section 506 having two inputs×two outputs whose input ports are coupled to the output ports of the interference photocoupler section 505, respectively. The output ports of the output photocoupler section 506 face the end face of the substrate 500. However, the mode of the optical waveguide is not limited to this and an optical waveguide similar to that in the embodiments in FIG. 5A and FIG. 5B or the like may also be used.

A traveling wave electrode 507 formed on the substrate 500 is a single drive scheme formed so as to be superimposed on the one branch modulation section 503. The drive signal (0 to $V\pi$) explained above is applied to the traveling wave electrode 507, and phase modulation of phase 0, $\pi$ is thereby given to the output light.

For the present embodiment, part of interference light is extracted from the output ports of the interference photocoupler section 505 to photodiodes 512 and 513 through monitoring waveguides 510 and 511 formed in the substrate 500. The photodiodes 512 and 513 are also built in the substrate 500. Electric monitoring signals output after being photoelectrically converted by the photodiodes 512 and 513 are supplied to a monitor 514 that is an electric circuit and the monitor 514 gives feedback to a driver 515 according to the monitoring result obtained by the monitoring signals. In this way, the period and voltage or the like of the drive signal output from the driver 515 are controlled.

Since the interference light after passing through the interference photocoupler section 505 has intensity modulation information, using this as monitoring light for control provides an advantage that the optical phase modulator can be easily controlled.

The Mach-Zehnder type optical modulator can be provided with at least two photocoupler sections having a plurality of inputs×a plurality of outputs from an input end to an output end. Incident light beams are output after interfering with each other, and as a result, such a photocoupler has the nature that a phase shift occurs in emerging light. Using a phase shift occurring in the photocoupler allows a necessary optical phase variation to be obtained even if the voltage of a drive signal is low. That is, if a photocoupler section is appropriately provided in the optical waveguide, when a voltage which causes the optical phase difference between the branch modulation sections to be a half wavelength is $V\pi$, it is possible to perform optical phase modulation of phase 0, $\pi$ according to a data signal through a voltage variation from 0 to $V\pi$ for a drive signal applied to the traveling wave electrode under the above described single drive scheme. Alternatively, in a dual drive scheme in which a traveling wave electrode is provided for each of the above described branch modulation sections, when a voltage which causes the optical phase difference between the branch modulation sections to be a half wavelength is $V\pi$, optical phase modulation of phase 0, $\pi$ can be performed according to a data signal through a voltage variation from 0 to $V\pi/2$ for a drive signal applied to each traveling wave electrode.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A Mach-Zehnder type optical modulator, comprising:
   an optical waveguide formed in an electro-optical substrate;
   an input section that inputs light to the optical waveguide;
   a plurality of branch modulation sections that generate branched input light, extend from the input section and modulate the branched input light;
   an interference photocoupler including a plurality of input ports and a plurality of output ports, the input ports being coupled to the branch modulation sections;
   an output photocoupler including a plurality of input ports coupled to the output ports of the interference photocoupler and also including a plurality of output ports; and
   a first traveling wave electrode that is superimposed on only one of the branch modulation sections and causes a refractive index of an optical waveguide of the one branch modulation section to vary by applying a drive signal thereto.

2. The Mach-Zehnder type optical modulator according to claim 1, further comprising a monitoring section that extracts part of light output from the output ports of the interference photocoupler and monitors the extracted light.

3. The Mach-Zehnder type optical modulator according to claim 2, wherein the monitoring section comprises a photodiode on the substrate.

4. A Mach-Zehnder type optical modulator, comprising:
   an optical waveguide formed in an electro-optical substrate;
   an input section that inputs light to the optical waveguide;
   a plurality of branch modulation sections that generate branched input light, extend from the input section and modulate the branched input light;
   an interference photocoupler including a plurality of input ports and a plurality of output ports, the input ports being coupled to the branch modulation sections;
   an output photocoupler including a plurality of input ports coupled to the output ports of the interference photocoupler and also including a plurality of output ports; and
   a traveling wave electrode that is superimposed on the branch modulation sections, wherein
   a polarization inversion region is partially formed in a region within the substrate in which the branch modulation sections is formed, and
   the traveling wave electrode is formed so as to change the refractive index of the optical waveguide of the different branch modulation sections inside and outside the polarization inversion region.

5. The Mach-Zehnder type optical modulator according to claim 1, further comprising a second traveling wave electrode that is superimposed on another branch modulation section that changes the refractive index of the optical waveguide of the other branch modulation section by applying drive signals.

6. The Mach-Zehnder type optical modulator according to claim 1, further comprising a monitoring section that extracts part of light output from the output ports of the interference photocoupler and monitors the extracted light,
wherein the drive signal is controlled according to the monitoring result of the monitoring section.

7. The Mach-Zehnder type optical modulator according to claim 6, wherein the monitoring section comprises a photodiode on the substrate.

8. A Mach-Zehnder type optical modulator comprising:
an optical waveguide formed in an electro-optical substrate;
an input photocoupler including a plurality of input ports that are configured to input light to the optical waveguide and a plurality of output ports;
a plurality of branch modulation sections that generate branched input light, extend from the output ports of the input photocoupler section and modulate the branched input light;
an interference photocoupler section including a plurality of input ports and a plurality of output ports, the input ports being coupled to the branch modulation section; an output photocoupler section including a plurality of input ports coupled to the output ports of the interference photocoupler section and also including one output port; and
a first traveling wave electrode that is superimposed on only one of the branch modulation sections and causes a refractive index of an optical waveguide of the one branch modulation section to vary by applying a drive signal thereto.

9. The Mach-Zehnder type optical modulator according to claim 8, further comprising a monitoring section that extracts part of light output from the output ports of the interference photocoupler section and monitors the extracted light.

10. The Mach-Zehnder type optical modulator according to claim 9, wherein the monitoring section comprises a photodiode on the substrate.

11. The Mach-Zehnder type optical modulator according to claim 8, further comprising a second traveling wave electrode that is superimposed on another branch modulation section that changes the refractive index of the optical waveguide of the other branch modulation section by applying drive signals.

* * * * *